United States Patent
Lindell

[11] Patent Number: 6,116,486
[45] Date of Patent: Sep. 12, 2000

[54] ANCHOR DEVICE FOR A LOAD CARRIER FOOT

[75] Inventor: Morgan Lindell, Varnamo, Sweden

[73] Assignee: Industri AB Thule, Hillerstorp, Sweden

[21] Appl. No.: 09/195,068

[22] Filed: Nov. 17, 1998

[30] Foreign Application Priority Data

Nov. 18, 1997 [SE] Sweden .................................. 9704237

[51] Int. Cl.[7] .................................................. B60R 9/058
[52] U.S. Cl. ............................................ 224/331; 224/322
[58] Field of Search ................................ 224/331, 917.5, 224/322, 325, 326; 248/316.4, 316.6

[56] References Cited

U.S. PATENT DOCUMENTS

| | | | |
|---|---|---|---|
| 4,364,500 | 12/1982 | Bott .......................................... | 224/326 |
| 4,382,532 | 5/1983 | Pflugfelder ............................... | 224/331 |
| 4,516,710 | 5/1985 | Bott .......................................... | 224/326 |
| 4,640,450 | 2/1987 | Gallion et al. ........................... | 224/331 |
| 4,993,615 | 2/1991 | Arvidsson . | |
| 5,025,967 | 6/1991 | Cronce et al. ........................... | 224/326 |
| 5,104,020 | 4/1992 | Arvidsson et al. ...................... | 224/331 |
| 5,226,570 | 7/1993 | Pedrini .................................... | 224/322 |
| 5,232,139 | 8/1993 | Cucheran ................................. | 224/326 |
| 5,275,320 | 1/1994 | Duemmler ............................... | 224/331 |
| 5,556,221 | 9/1996 | Brunner ................................... | 224/326 |

FOREIGN PATENT DOCUMENTS

| | | |
|---|---|---|
| 3614740 | 11/1987 | Germany . |
| 3729641 | 3/1989 | Germany . |
| 4423607 | 6/1995 | Germany . |
| 455589 | 7/1988 | Sweden . |

*Primary Examiner*—Stephen P. Garbe
*Attorney, Agent, or Firm*—Royston, Rayzor, Vickery, Novak & Druce, L.L.P.

[57] ABSTRACT

An anchor for a vehicle roof-top load carrier. The anchor includes a foot arrangement having an attachment portion adapted for releasable attachment to a load carrier strut and an anchorage portion adapted for releasable securing cooperation with a fix point disposed on a carrying vehicle in a mounted configuration. For reference purposes, such a mounted configuration establishes a longitudinal direction of the foot arrangement which is substantially parallel to a straight forward direction of travel of such a carrying vehicle, a vehicle side of the foot arrangement and an exterior side of the foot arrangement. The anchorage portion has a rigidly secured first plate configured for approximate horizontal positioning above a roof of such a carrying vehicle. A second plate is coupled to the first plate for longitudinal movement relative thereto, the longitudinal movement being controlled by a plate guide. First and second gripping members are included that are movable towards and away from one another in the longitudinal direction by an operating device. The first gripping member is longitudinally fixed upon the first plate and the second gripping member is longitudinally fixed upon the second plate. The operating device has an actuator extending transversely to the longitudinal direction and toward the exterior side of the foot arrangement. The operating device has a first operating guide in the first plate that is oriented transversely to the longitudinal direction and a second operating guide in the second plate that is obliquely oriented to the longitudinal direction. A runner is configured to be reciprocally movable under the action of a force member along the transversely oriented first operating guide. The runner has an engagement member positioned in the obliquely oriented second operating guide. Further, the runner and the engagement member are arranged together so that movement of the runner transversely of the longitudinal direction causes movement in the second plate in the longitudinal direction.

10 Claims, 5 Drawing Sheets

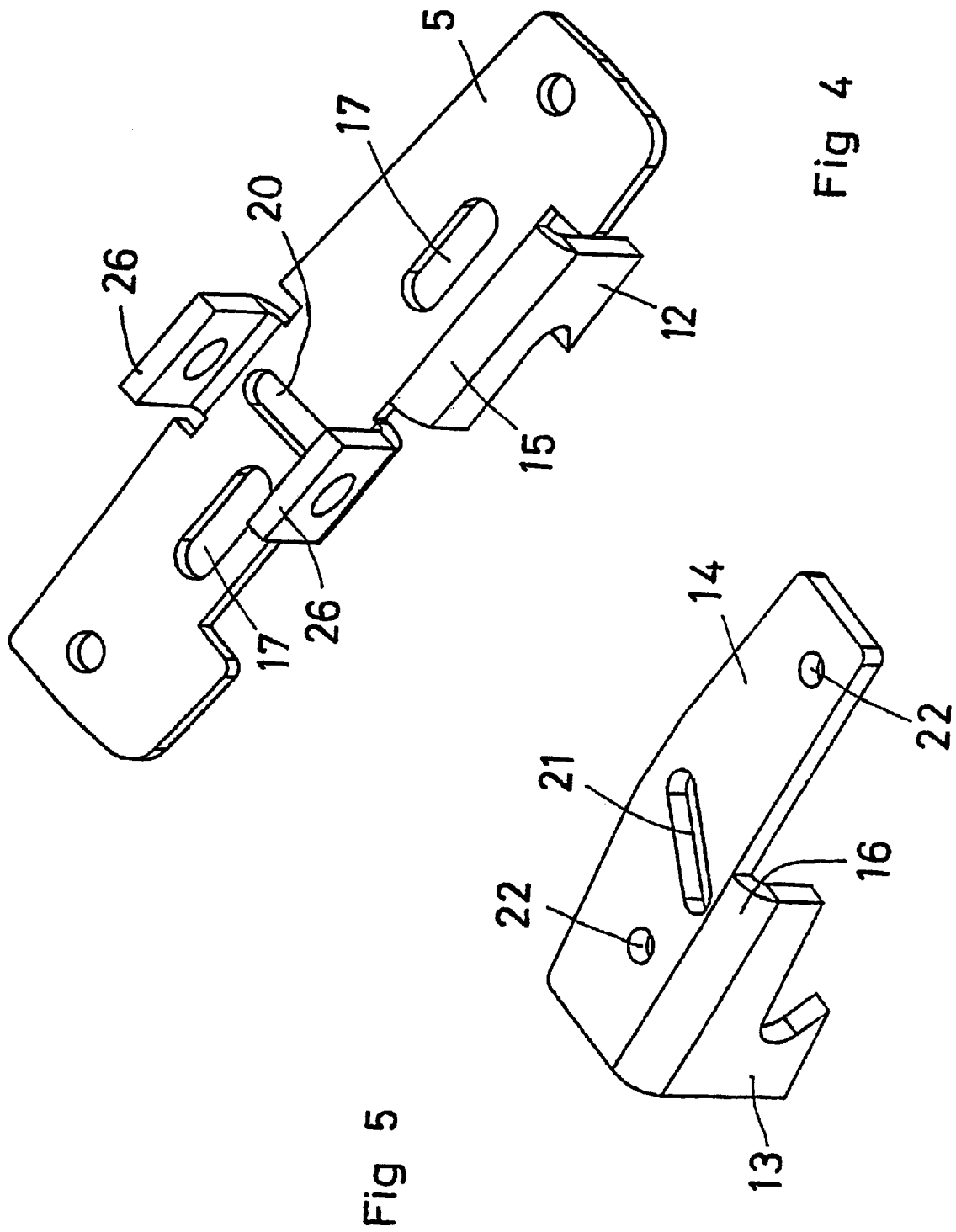

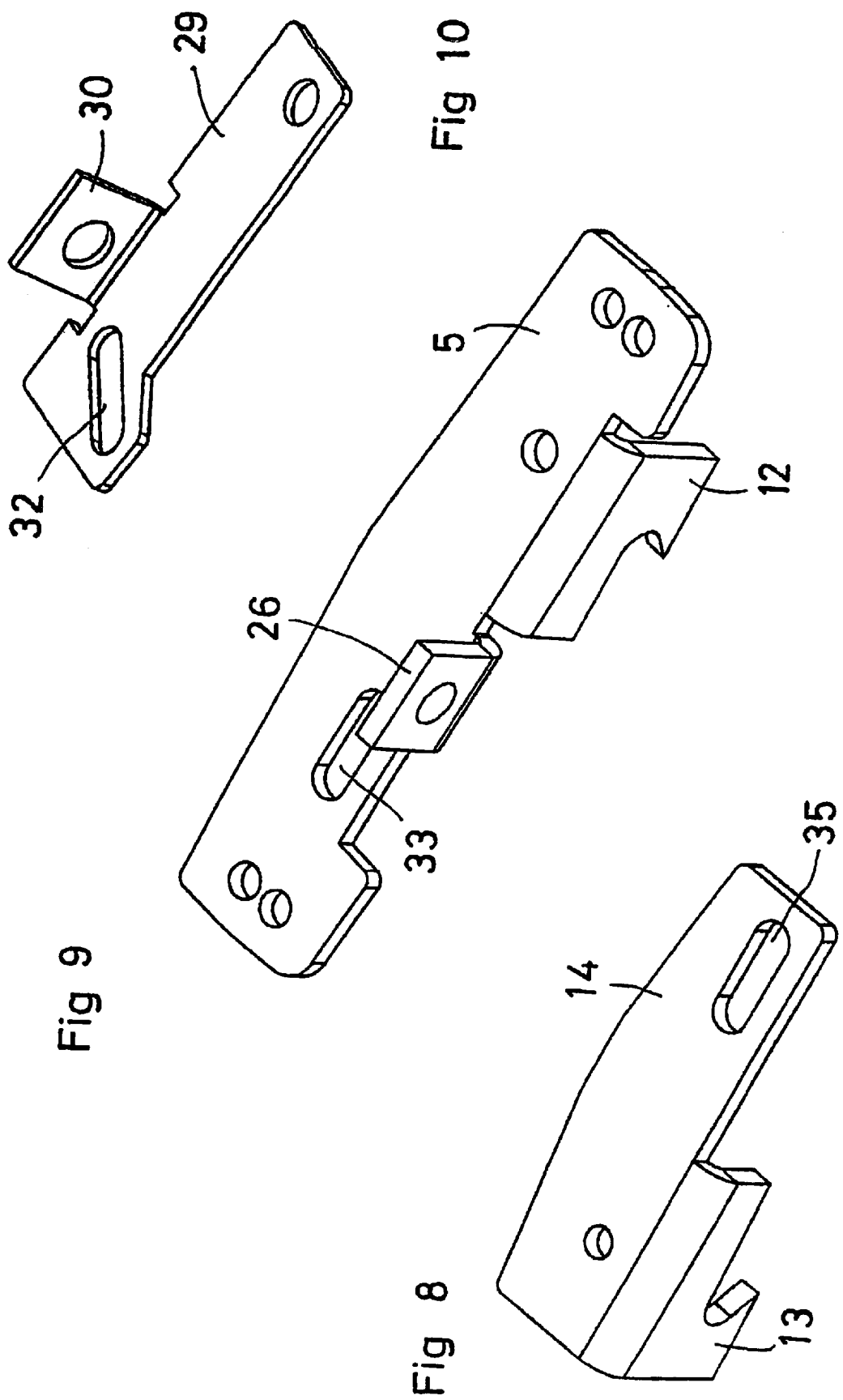

ANCHOR DEVICE FOR A LOAD CARRIER FOOT

DESCRIPTION

1. Technical Field

The present invention relates generally to an anchorage device for a load carrier intended for a vehicle roof, with a load carrier strut extending over the vehicle roof with a foot arrangement at each end having a first and second gripping member movable towards and away from one another in the longitudinal direction of the vehicle. The gripping members are disposed for securing the load carrier on the vehicle by cooperation with a fix point disposed on the vehicle. The gripping members are movable and securable on the fix point under the action of an operating device.

2. Background Art

For securing load carriers or roof racks on vehicle roofs, use is made of fix points which are secured on and often removable from the vehicle roof, and are designed for cooperation with corresponding anchorage devices on the load carrier. Normally, the fix points disposed on the vehicle are countersunk in recesses in the vehicle roof or in longitudinal grooves or gutters in the roof.

The "fix points" disposed on the vehicle, as they are often called, have a configuration and positioning which are given beforehand, that is normally established at the time of the vehicle's manufacture. For this reason, the anchorage devices of the load carrier apparatus must be specifically adapted to each type of vehicle-mounted fix point. These are often designed in such a manner that the gripping direction between the anchorage devices and the vehicle-mounted fix points will be approximately in the longitudinal direction of the vehicle. Examples of constructions of this type are disclosed in DE-C23614740 and SE-B455589, the disclosures of each of which are expressly incorporated herein by reference.

The first-mentioned publication discloses an anchorage device which has a scissors arrangement whose lower shanks grasp about the vehicle-mounted fix points and whose upper shanks are movable towards and away from one another under the action of a screw mechanism. Certainly, it is possible to obtain a good engagement between the movable shanks and the vehicle-mounted fix point, but in all likelihood stability in the anchorage device will be defective at least in the transverse direction of the vehicle because of pivot action between the shanks. In addition, the screw arrangement is not readily accessible for its operation since its operating device is turned to face forwards or rearwards in the direction of travel of the vehicle.

In the latter of these documents, there is disclosed a construction which is intended for concealed anchorage in behind the upper edge of a vehicle door. This construction is complex and, for satisfactory function, requires an extremely high degree of precision between the anchorage devices disposed on the vehicle and the support surfaces. Also here, the stability transversely of the longitudinal direction of the vehicle might possibly be called into doubt.

In view of the above described deficiencies associated with the use of known designs for an anchorage device, the present invention has been developed to alleviate these drawbacks and provide further benefits to the user. These enhancements and benefits are described in greater detail hereinbelow with respect to several alternative embodiments of the present invention.

DISCLOSURE OF THE INVENTION

The present invention in its several disclosed embodiments alleviates the drawbacks described above with respect to conventionally designed anchorage devices for a load carrier foot and incorporates several additionally beneficial features.

The present invention has for its object to design the anchorage device intimated by way of introduction such that it gives a very stable securement of the load carrier in all conceivable loading directions. The present invention further has for its object to design the anchorage device such that it, in a simple and convenient manner, may be operated from the side of the vehicle. Finally, the present invention has for its object to realize an anchorage device which is simple and economical to manufacture and possesses a high degree of mechanical strength.

The objects forming the basis of the present invention will be attained if the anchorage device intimated by way of introduction is characterized in that the foot arrangement, at its lower end, has a rigidly secured first plate which is approximately horizontal or more or less follows the contour of the vehicle roof in the region of the foot arrangement, this plate having the first gripping member, that a second plate, via a guide, movable in the longitudinal direction of the vehicle along the first plate, the second plate displaying the second gripping member, and that the operating device has, for its operation, an actuator which is turned to face out towards and is accessible and operable from the side of the vehicle.

In at least one embodiment, the present invention takes the form of an anchor for a vehicle roof-top load carrier. The anchor includes a foot arrangement having an attachment portion adapted for releasable attachment to a load carrier strut and an anchorage portion adapted for releasable securing cooperation with a fix point disposed on a carrying vehicle in a mounted configuration. For reference purposes, such a mounted configuration establishes a longitudinal direction of the foot arrangement which is substantially parallel to a straight forward direction of travel of such a carrying vehicle, a vehicle side of the foot arrangement and an exterior side of the foot arrangement. The anchorage portion has a first plate rigidly secured to the foot arrangement and which is configured for approximate horizontal positioning above a roof of such a carrying vehicle, but in any event in such a configuration that the top surface of the vehicle's roof is accommodated, if not engaged. A second plate is coupled to the first plate for longitudinal movement relative thereto, the longitudinal movement being controlled by a plate guide. First and second gripping members are included that are movable towards and away from one another in the longitudinal direction by an operating device. The first gripping member is longitudinally fixed upon the first plate and the second gripping member is longitudinally fixed upon the second plate. The operating device has an actuator extending transversely to the longitudinal direction and toward the exterior side of the foot arrangement.

The operating device has a first operating guide in the first plate that is oriented transversely to the longitudinal direction and a second operating guide in the second plate that is obliquely oriented to the longitudinal direction. A runner is configured to be reciprocally movable under the action of a force member along the transversely oriented first operating guide. The runner has an engagement member positioned in the obliquely oriented second operating guide. Further, the runner and the engagement member are arranged together so that movement of the runner transversely of the longitudinal direction causes movement in the second plate in the longitudinal direction.

The beneficial effects described above apply generally to the exemplary devices and mechanisms disclosed herein of the anchorage device for a load carrier foot. The specific structures through which these benefits are delivered will be described in detail hereinbelow.

BRIEF DESCRIPTION OF THE DRAWINGS

The invention will now be described in greater detail in the following way of example only and with reference to the attached drawings, in which:

FIG. 4 shows a first or upper plate included in the anchorage device;

FIG. 5 shows a second or lower plate included in the anchorage device;

FIG. 8 shows a modified embodiment of the lower plate of FIG. 5;

FIG. 9 shows a modified embodiment of the upper plate of FIG. 4; and

FIG. 10 shows a rocker included in the modified embodiment.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Furthermore, elements may be recited as being "coupled"; this terminology's use contemplates elements being connected together in such a way that there may be other components interstitially located between the specified elements, and that the elements so specified may be connected in fixed or movable relation one to the other unless otherwise recited.

Figure 1:
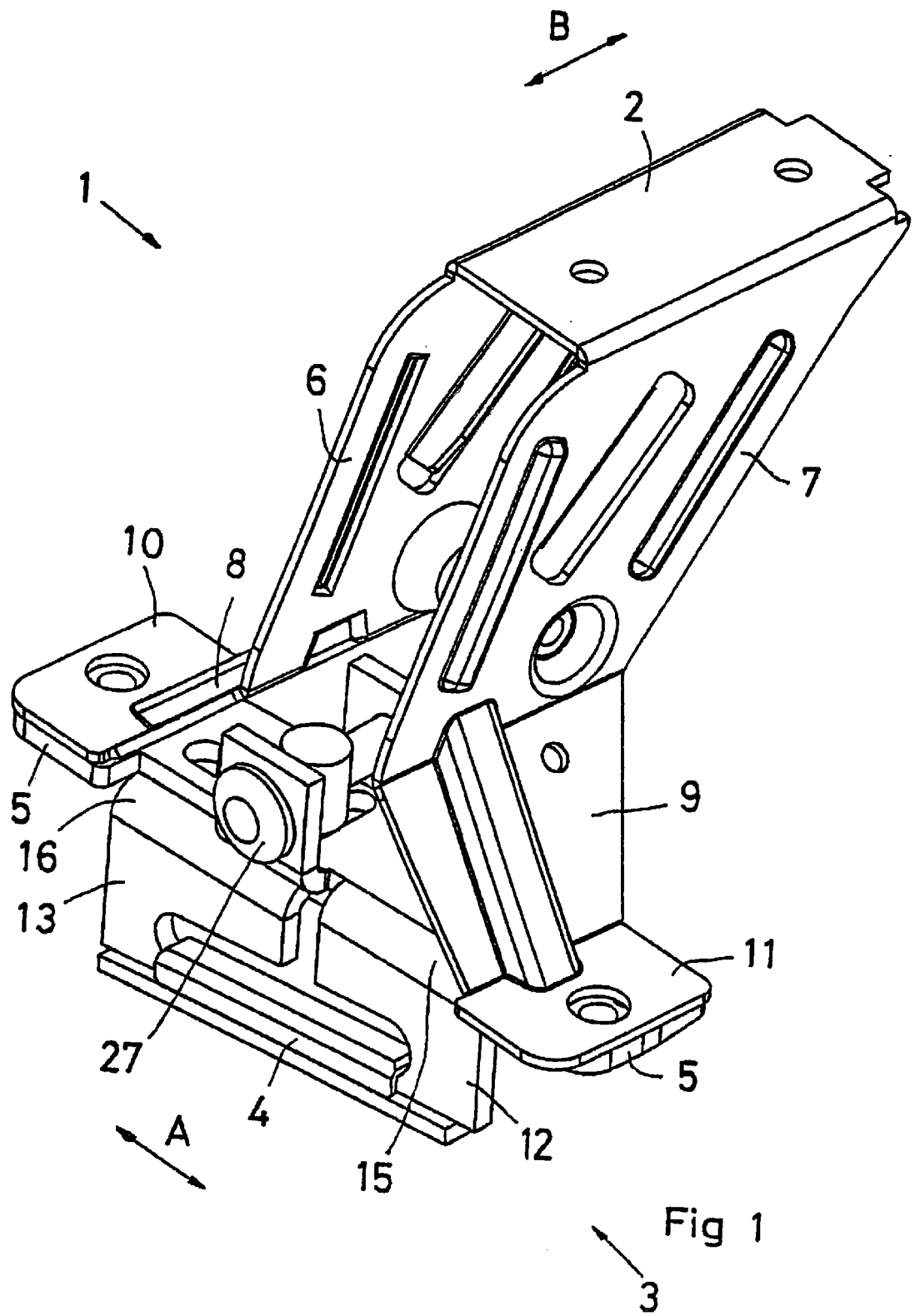
FIG. 1 is a schematic perspective view of a foot arrangement according to the present invention.

Referring to FIG. 1 a foot arrangement is shown in perspective which is included in a load carrier intended for vehicle mounting and which has a load carrier strut (not shown on the Drawing) which, in the direction of the arrow B, extends transversely over the vehicle roof between opposing side edge portions thereof. The foot arrangement, which is generally designated 1, has an upper plate 2 against which the end portion of the load carrier strut (not shown) is secured. The load carrier strut may be adjustable in its longitudinal direction, but may also be rigidly or permanently connected to the foot arrangement 1.

At a lower portion, the foot arrangement 1 has an anchorage device which is generally designated 3 and which is intended to cooperate with and secure the foot arrangement 1 on a fix point 4 which is permanently mounted on the vehicle roof. As a rule, the fix point 4 is countersunk in a recess or in a longitudinal groove in the roof. The configuration and location of the fix point(s) 4 are thus given beforehand and are not part of the present invention. However, it should be mentioned that the fix point 4 is designed such that gripping members included in the anchorage device 3 are movable into and away from positionally fixing and load-transferring cooperation with the fix point 4 by mutual movements approximately in the longitudinal direction of the vehicle (the arrow A).

The vehicle roof is not shown in FIG. 1 since it may be of greatly varying configuration, nor is the recess or groove shown in which, as was mentioned above, the fix point 4 is oftened disposed. However, the anchorage device 3 has an upper plate 5 which, in the mounted position of the load carrier on the vehicle, is approximately horizontal or which approximately extends along or follows the contour of the vehicle roof in the region of the foot arrangement.

The foot arrangement 1 has opposing side walls 6 and 7 so that the side wall 6 is the front wall if the foot arrangement 1 is placed on the left-hand side of the vehicle. The side walls 6 and 7 have lower portions 8 and 9, respectively, angled away from one another and merging in horizontal anchorage plates 10 and 11, respectively, or other anchorage plates also similarly oriented as the upper plate 5. The first or upper plate 5 of the anchorage device abuts against and is secured to, for example by riveting, the anchorage plates 10 and 11. As a result of the rigid connection between the powerfully dimensioned upper plate 5 and the anchorage plates 10 and 11 of the foot arrangement 1, an extremely rigid structure will be realized which, also in the longitudinal direction of the load carrier strut (the arrow B), is capable of transferring large loadings.

The anchorage device 3 has a first gripping member 12 which is plate-shaped and is of one-piece manufacture with the upper plate 5 of the anchorage device. The gripping member 12 is placed approximately in a vertical plane in the longitudinal direction of the vehicle (the arrow A) and engages with the fix point 4 in a manner which is determined by the geometry of the fix point. The anchorage device 3 further includes a second gripping member 13 which is arranged in a plane which approximately coincides with or is parallel with the plane of the first gripping member 12. The second gripping member 13 is movable towards and away from the first gripping member 12 in the longitudinal direction of the vehicle. The second gripping member 13 is disposed on a second plate 14 (FIGS. 3 and 5) which extends along the underside of the upper plate 5 and which is movable therealong in the longitudinal direction of the vehicle.

Both of the gripping members 12 and 13 display a configuration which is adapted to the configuration of the given vehicle-mounted fix point 4. In such instance, engagement portions on the gripping members may be complementary to corresponding engagement portions on the fix point. The exact form is not critical as long as it makes for a rigid, form-locked and load-transferring interconnection of the gripping members 12 and 13 with the fix point.

Both of the gripping members 12 and 13 are disposed at those edges of each respective plate 5 and 14 which are turned to face out towards the side of the vehicle.

Both of the gripping members 12 and 13 are of one-piece manufacture with each respective plate and are united to them by the intermediary of approximately right-angle bent zones 15 and 16, respectively.

As an alternative to the right-angle bent zones 15 and 16, other bending angles may also occur which are dictated by the requirement that the gripping members 12 and 13 must approximate the configuration of the vehicle body. Nor is it necessary that the gripping members 12 and 13 be planar, but they may be arched, and even S-shaped as seen from the rear or the front in order to follow the configuration of the vehicle body.

The plates 5 and 14 have mutually engaging linear guides by means of which the plates are guided in relation to one another so that they are movable in the longitudinal direction of the vehicle. The guides are further designed in such a manner that they hold the plates in position along one another and also permit direct contact with metal-to-metal between them. Thus, the guides prevent the plates from being separated.

Figure 2:
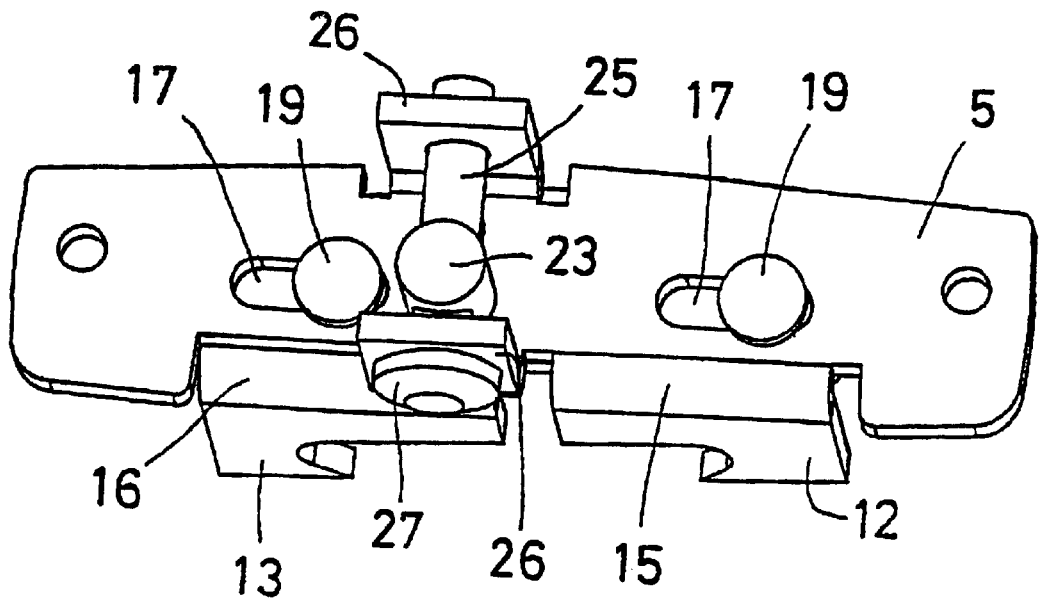
FIG. 2 is a perspective view obliquely from above and outside of an anchorage device included in the foot arrangement.
Figure 3:
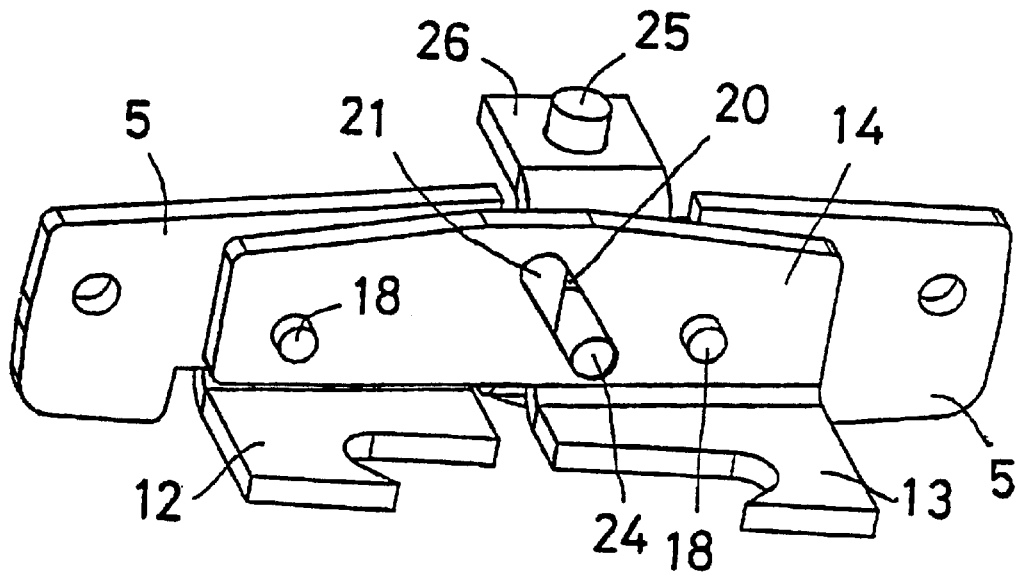
FIG. 3 shows the anchorage device of FIG. 2 seen in perspective view obliquely from beneath and inside.

It will be apparent from FIGS. 2 and 3 that the linear guides include longitudinal grooves 17 in the upper plate 5 rigidly secured in the anchorage plates 10 and 11 of the foot arrangement. The grooves 17 are arranged to define the direction of movement of the movable gripping device 13 and are, therefore, directed approximately parallel with the longitudinal direction of vehicle (the arrow A). The lower plate 14 has pins 18 which are secured in the lower plate and which extend through the elongate grooves 17 up to the upper side of the upper plate 5, where the pins have arrest means in the form of heads 19 which prevent withdrawal of the pins from the grooves. As a result of the provision of the pins 18 and the heads 19, both of the plates 5 and 14 are interconnected such that they are slidable along one another in the longitudinal direction of the vehicle.

Alternatives are also conceivable in which the grooves 17 and the pins 18 are exchanged such that the grooves are accommodated in the lower plate 14 while the pins 18 are secured to the upper plate 5.

For maneuvering the two gripping members 12 and 13 in relation to one another, the anchorage device 3 includes an operating device which has an actuator 27 which is turned to face out towards the side of the vehicle and is actuable therefrom.

The operating device includes a transverse groove 20 (the arrow B) disposed in the upper plate 5. The lower plate 14 has an obliquely directed groove 21 in relation to the groove 20 and in relation to the longitudinal direction of the vehicle, as well as apertures 22 for fixing the pin 18. The grooves 20 and 21 in the upper and lower plate, respectively, are oriented so that they may be considered as crossing one another. On the upper side of the upper plate, a runner 23 is disposed which is movable in the longitudinal direction of the transverse groove 20 in the upper plate 5. The runner 23 has, on its underside, a projection or a pin 24 which extends through the transverse groove 20 of the upper plate 5 and engages in the oblique groove 21 of the lower plate 14. By displacing the runner 23 in the longitudinal direction of the transverse groove 20, the lower plate 14 with the second gripping member 13 will move in the longitudinal direction of the vehicle along the two grooves 17 in the upper plate. This arrangement therefore realizes a switching of a transverse (the arrow B) force/direction of movement to a longitudinal (the arrow A) force/direction of movement.

The operating device further includes a force member in the form of a screw or bolt 25 which is provided for displacing the runner 23 reciprocally along the transversely directed groove 20 in the upper plate 5. In such instance, the screw 25 is axially fixed in relation to the upper plate and is in threaded engagement in a threaded bore provided in the runner 23.

For axially fixing the screw 25 in relation to the upper plate 5, there are included upwardly directed lugs 26 at opposing edges through which the screw 25 extends. On its end facing out towards the side of the vehicle the screw 25 has a head 27 with an engagement member which constitutes the above-mentioned actuator. At its opposing end, the screw has an arrest member (not shown) which axially fixes the screw in relation to both of the lugs 26.

The upper plate 5 is of one-piece manufacture with the two upwardly directed lugs 26, and these are united to the plate by the intermediary of approximately right-angle bent zones.

As a result of the threaded engagement of the axially fixed screw 25 with the runner 23, the runner will be positively displaced along the screw in the opposite directions depending upon the direction of rotation of the screw. This positive longitudinal displacement of the runner in the groove 20 entails a correspondingly positive longitudinal displacement of the lower plate 14 in the longitudinal direction of the vehicle. As a result, this arrangement is not dependent on any return springs or similar devices for realizing opening of both of the gripping members 12 and 13 from one another once these have been applied against a vehicle-mounted fix point 4.

DESCRIPTION OF ALTERNATIVE EMBODIMENTS

FIGS. 6–10 show a modified embodiment of the present invention. For details which are substantially identical or analogous with details described above, the same reference numerals will be employed.

Figure 6:
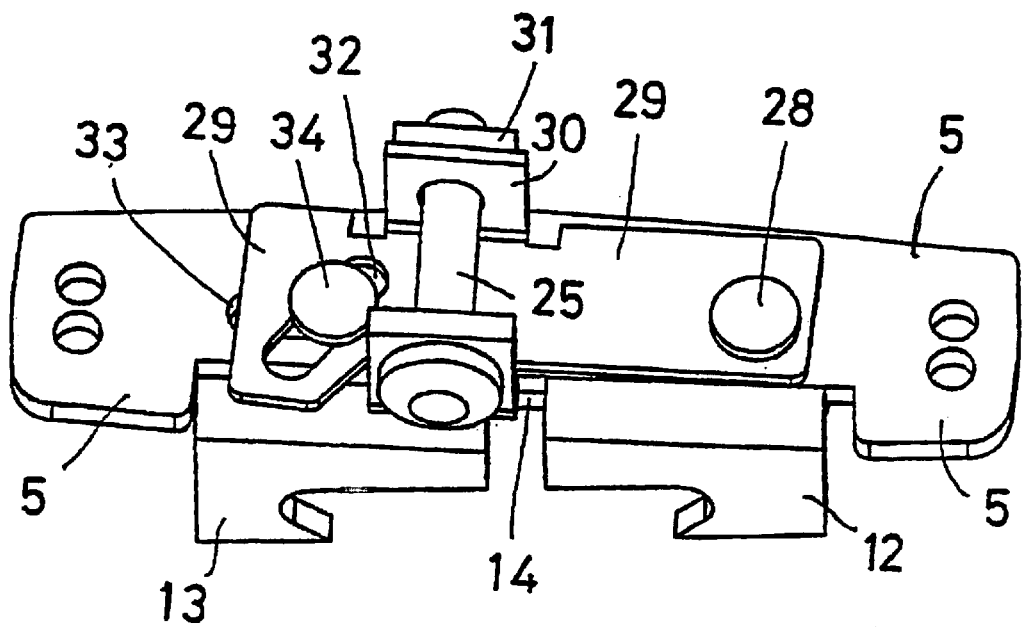
FIG. 6 is a view corresponding to that of FIG. 2 of a modified embodiment of the device according to the present invention.
Figure 7:
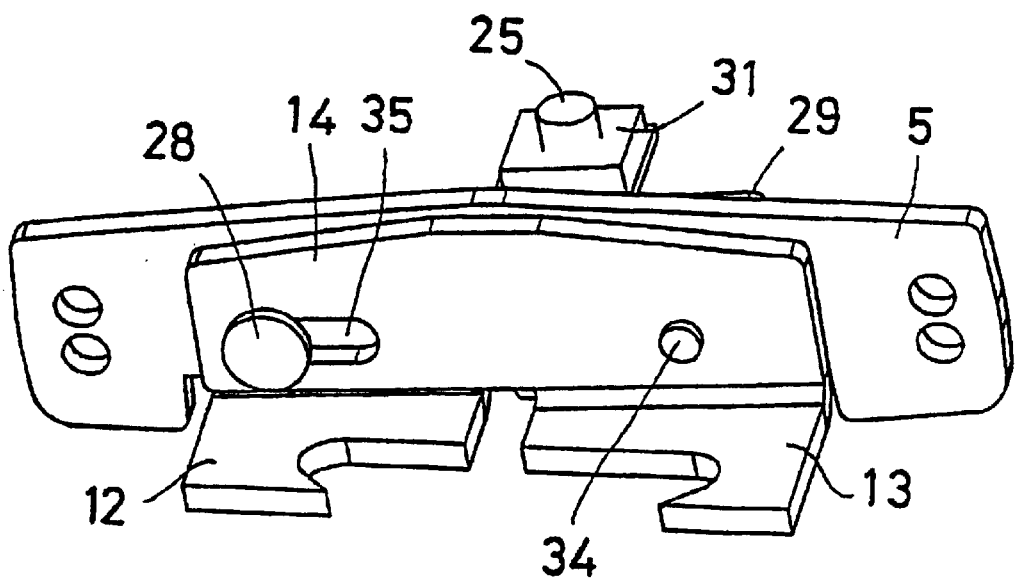
FIG. 7 shows the embodiment according to FIG. 6 in a view corresponding to that of FIG. 3.

It will be apparent from FIG. 6 that there is disposed on the upper side of the upper plate 5 a rocker in the form of a plate 29 pivotal about a rivet 28. The rocker is pivotal along the upper side of the upper plate 5 and abuts against it. Further, the rocker has an upwardly directed lug 30 with an aperture through which the above-described screw 25 extends. On the outside of the lug 30, the screw 25 is in threaded engagement with a nut 31.

On tightening of the screw 25, the rocker will move in the counterclockwise direction around the rivet 28. When the screw 25 is backed-off, a return spring disposed about the screw 25 may be employed for the clockwise pivoting of the rocker 29.

It will further be apparent from FIG. 6 that the rocker 29 has, in its end facing away from the rivet 28, a groove 32 which is obliquely directed in the same manner as the obliquely directed groove 21 in the lower plate 14 in the embodiment according to FIGS. 1–5. At the underside of the rocker, the upper plate 5 has, in the region of the obliquely directed groove 32, a groove 33 extending in the longitudinal direction of the upper plate 5. A rivet 34 extends through both of the grooves 32 and 33 and is secured in the lower plate 14 (see FIG. 7). On pivoting of the rocker 29 under the action of the screw 25 or a return spring, the rivet 34 will, because of the obliquely directed groove 32, move in the longitudinal direction of the longitudinally directed groove 33 in the upper plate 5 in order thereby to entrain the lower plate 14 in this longitudinal directed movement.

In order to permit the longitudinal directed movement of the lower plate 14 with the gripping member 13, the rivet 28 about which the rocker 29 is pivotal is disposed through a longitudinally directed groove 35 in the lower plate 14. The longitudinally directed grooves 33 and 35, together with the rivets 28 and 34, form a linear guide in the same manner as that described above between the upper plate 5 and the lower plate 14, so that both of these plates will be displaceable relative to one another approximately in the longitudinal direction of the vehicle.

FIGS. 8–10 show details of the lower plate 14, the upper plate 5 and the rocker 29 separately.

In the foregoing description, the foot arrangement in its entirety has been described as manufactured from plate material. Naturally, it is also possible to manufacture the foot arrangement 1 and the upper plate 5 in one piece by casting. Such a one-piece manufactured unit may, in itself, also include additional components.

An anchorage device for a load carrier foot and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed and desired to be secured by Letters Patent is as follows:

1. An anchor for a vehicle roof-top load carrier, said anchor comprising:

a foot arrangement having an attachment portion adapted for releasable attachment to a load carrier strut and an anchorage portion adapted for releasable securing cooperation with a fix point disposed on a carrying vehicle in a mounted configuration, such a mounted configuration establishing a longitudinal direction of said foot arrangement substantially parallel to a straight forward direction of travel of such a carrying vehicle, a vehicle side of said foot arrangement and an exterior side of said foot arrangement;

said anchorage portion having a rigidly secured first plate configured for approximate horizontal positioning above a roof of such a carrying vehicle and a second plate coupled to said first plate for longitudinal movement relative thereto, said longitudinal movement controlled by a plate guide;

first and second gripping members movable towards and away from one another in the longitudinal direction by an operating device, said first gripping member being longitudinally fixed upon said first plate and said second gripping member being longitudinally fixed upon said second plate; and said operating device having an actuator extending transversely to said longitudinal direction and toward said exterior side of said foot arrangement.

2. The anchor as recited in claim 1, wherein said second plate rests against an underside of said first plate and each of said first and second plates are mutually engaged one to the other by said plate guide, said plate guide being adapted to limit relative movement between said first and second plates to substantially linear relative movement.

3. The anchor as recited in claim 1, further comprising:

said first gripping member being disposed upon an edge portion of said first plate and said second gripping member being disposed upon an edge portion of said second plate; and each of said first and second gripping members being of substantially planar construction and extending substantially vertically and at right angles from said first and second plates, respectively, in said mounted configuration.

4. The anchor as recited in claim 1, further comprising:

said operating device having a first operating guide in said first plate, said first operating guide oriented transversely to said longitudinal direction;

said operating device having a second operating guide in said second plate, said second operating guide obliquely oriented to said longitudinal direction;

a runner configured to be reciprocally movable under the action of a force member along said transversely oriented first operating guide and said runner having an engagement member positioned in said obliquely oriented second operating guide; and said runner and said engagement member being arranged together so that movement of said runner transversely of the longitudinal direction causes movement in said second plate in said longitudinal direction.

5. The anchor as recited in claim 4, further comprising:

said operating device having a screw axially fixed relative to said first plate and threadably engaged in a threaded bore through said runner.

6. The anchor as recited in claim 5, further comprising:

said screw extending through lugs disposed at opposing longitudinal edges of said first plate and upstanding therefrom.

7. The anchor as recited in claim 1, wherein said first gripping member and said first plate are joined by a first bend and are unitarily constructed together, said first bend being disposed along an edge of said first plate and oriented so that an interior of said first bend is oriented toward said vehicle side of said foot arrangement.

8. The anchor as recited in claim 1, wherein said second gripping member and said second plate are joined by a second bend and are unitarily constructed together, said second bend being disposed along an edge of said second plate and oriented so that an interior of said second bend is oriented toward said vehicle side of said foot arrangement.

9. The anchor as recited in claim 1, wherein said first gripping member is rigidly fixed to said first plate.

10. The anchor as recited in claim 1, wherein said second gripping member is rigidly fixed to said second plate.

* * * * *